United States Patent [19]

Ivins

[11] Patent Number: 5,080,309

[45] Date of Patent: Jan. 14, 1992

[54] REMOVABLY POSITIONABLE VISOR APPARATUS AND SUCTION RELEASE MECHANISM

[76] Inventor: Kevin W. Ivins, P.O. Box 1051, Tijeras, N. Mex. 87059

[21] Appl. No.: 471,923

[22] Filed: Jan. 25, 1990

[51] Int. Cl.[5] .................................................. F16B 47/00
[52] U.S. Cl. ........................... 248/205.8; 248/206.3; 359/227
[58] Field of Search ............ 350/266, 276 R, 631–632; 296/97; 248/467, 288.5, 205.8, 205.9, 206.3, 206.4

[56] References Cited

U.S. PATENT DOCUMENTS

| D. 302,107 | 7/1989 | Adams | 248/205.8 X |
| 1,829,924 | 11/1931 | Evertts . | |
| 2,020,585 | 11/1935 | Stansberry | 296/97 |
| 2,212,007 | 8/1940 | Buchanan | 296/97 |
| 2,706,659 | 4/1955 | Landis | 296/97 |
| 2,739,632 | 3/1956 | Rodriguez | 248/205.8 |
| 3,445,135 | 5/1969 | Masi | 296/97 |
| 3,475,080 | 10/1969 | Shumway | 350/276 |
| 3,593,983 | 7/1971 | Csenyi | 248/205.9 X |
| 3,857,630 | 12/1974 | Gonzalez | 350/276 R |
| 3,957,357 | 5/1976 | Kulikowski | 350/304 |
| 4,172,613 | 10/1979 | Furando | 296/97 G |
| 4,505,446 | 3/1985 | Roder | 248/205.8 |

FOREIGN PATENT DOCUMENTS 699748 11/1953 United Kingdom ............ 248/205.8

Primary Examiner—David L. Talbott
Attorney, Agent, or Firm—Donovan F. Duggan; Deborah A. Peacock

[57] ABSTRACT

The disclosure relates to a removably positionable visor and suction release mechanism which are particularly adapted for a vehicle windshield, windows, and smooth surfaces. The visor includes a visor element, which is provided with one or more suction cups for attaching the visor element at any selected location on the desired surface. The vacuum breaking mechanism, which is engaged by a spring-loaded, thumb-actuated projection, simultaneously breaks the vacuum in each suction cup so as to enable the visor to be easily removed without wrenching. The visor further includes a handle that is cooperably positioned with respect to the thumb-actuated projection, so as to enable a vehicle operator to safely and quickly remove and relocate the visor with only one hand.

10 Claims, 2 Drawing Sheets

REMOVABLY POSITIONABLE VISOR APPARATUS AND SUCTION RELEASE MECHANISM

BACKGROUND OF THE INVENTION

Field of the Invention (Technical Field)

The invention relates to sun and other relatively intense light screening visors and more particularly to removably positionable visors for use on vehicular windshields and windows to protect an operator's eyes from sun, oncoming headlights, and mirror reflections.

Description of the Related Art Including Information Disclosed under 37 C.F.R. §§1.97-1.99 (Background Art)

Truck drivers, automobile and light truck operators, and pilots of airplanes, boats, and ships frequently encounter sunrises, sunsets, and sun glare, directly and as reflected from water, glass, and chrome surfaces during daylight hours. During the evening and at night, oncoming headlights and other bright lights, as well as headlights reflected from outside rear view mirrors, are annoying and dangerous sources of glare for drivers and are sometimes so bright as to be capable of temporarily blinding the driver and robbing him or her of night vision.

Vehicle manufacturers at present offer only opaque visors mounted above the windshield. These visors rotate into place and can be swiveled to cover the top of a side window. While they are helpful, such visors are limited in placement range and will not cover low sun position, oncoming headlights, or headlights reflected from the vehicle's rear view mirrors. Too, such visors are not darkly shaded see-through devices. Airplanes are provided with darkly shaded see-through sun visors which are movable to sun location. Such visors are mounted in various ways suitable for dealing with sun in a pilot's eyes, but not for screening outside rear view mirror headlight glare.

A number of sun visors are known in the prior art. Several disclose the use of one or more suction cups to attach the visor to a windshield. For example, U.S. Pat. No. 1,829,924, to J. P. Evertts, discloses a glare shield mounted on an elongate arm extending from a suction cup assembly having a single suction cup. U.S. Pat. No. 2,706,659, to J. A. Landis, also discloses a glare shield that is affixed to an arm that extends from a suction cup assembly having a single suction cup. U.S. Pat. No. 4,172,613, to Furando, discloses a glare shield which is held to a windshield by two suction cups, and which is particularly adapted to straddle the post of a rear view mirror which extends from a windshield. Each of these foregoing glare shields suffers from the disadvantage of having no mechanism for easily dislodging the suction cup or cups, thus rendering them particularly awkward to safely remove and/or relocate with just one hand while driving. Additionally, the Evertts and Landis devices suffer from the disadvantage of having elongate arms which hang from the suction cup assemblies, thereby making them subject to swinging motion and also interfering with their relocation.

U.S. Pat. No. 1,513,769, to Sullivan, discloses a partially silvered combined mirror and sun shield for a vehicle windshield. This combined mirror and sun shield is however only positionable over a predetermined arcuate range, as the shield is mounted on an arm extending from a fixed attachment on the windshield frame. U.S. Pat. No. 1,868,031, to Sudbrink, also discloses a glare shield that is attached to a rigid arm that extends from a fixed attachment point on the windshield frame. U.S. Pat. No. 3,372,953, to Weaver, also discloses a glare shield pivotably attached to an extendable arm that is affixed to the frame of an auto windshield. All of these glare shields are limited in their range and variety of possible positions as a consequence of being mounted on rigid arms which are affixed to the windshield frame.

U.S. Pat. No. 2,020,585, to Stansberry, discloses a visor which is attachable as an extension to the conventional visor ordinarily provided in automobiles, and which is not otherwise movable about the windshield. U.S. Pat. No. 2,212,007, to Buchanan, discloses a similar supplementary visor, which is also attachable to the regular visor of an automobile and which is thereby limited in its application. U.S. Pat. No. 3,957,357, to Kulikowski, discloses a combined rear view mirror and sun visor, with the sun visor being essentially limited to one location beneath the mirror. Each of these visors is limited in the range of its application by the fixed location of the ordinary visor or rear view mirror.

U.S. Pat. No. 2,878,714, to Van Denburg, discloses a glare shield that is mounted on an extendable arm, and a pair of wedge shaped glass plates are used to reduce light intensity by selective refraction of light passing through the plates.

U.S. Pat. No. 3,445,135, to Masi, discloses a perforated sun visor material, which may be utilized instead of the conventional sun visor in an automobile, or as an extension of such a conventional visor, or as a rollable curtain for a vehicle.

U.S. Pat. No. 3,475,080, to Shumway, discloses a sun visor made of two sheets of a polymeric material having particular light transmittance characteristics, and which is pivotably mounted in a conventional manner in an automobile.

U.S. Pat. No. 3,857,630, to Gonzalez, discloses a vehicle sun visor which is electrically driven to travel along a track extending along the upper inside edge of a windshield of a motor vehicle. Although particularly desirable in that it can be selectively positioned by means of a changeover switch which can be located for the convenience of the driver, it is nevertheless limited in positions to the range of positions spanned by the track.

SUMMARY OF THE INVENTION (DISCLOSURE OF THE INVENTION)

In accordance with the present invention there is provided a removably positionable visor apparatus comprising a planar element having a preselected shape and selected or reduced light transmission characteristics, one or more suction cups for readily removably mounting and relocating, preferably with one hand, the planar element on a smooth surface, and structure selectively controllable by a user for disengaging the suction cups, when desired. The suction cups are affixed to the planar element. The suction cup disengaging structure preferably comprises slidable suction cup engaging suction breaking structure for selectively and simultaneously breaking the vacuum on each suction cup, such as a slide bar with knife edges for sliding under suction cup lips or tabs present on the lips. The slidable suction breaking means is preferably spring loaded in a position disengaged from the suction cups, and is preferably controllable by a user to simultaneously disengage all of a plurality of suction cups. The suction cup disengaging bar may comprise a projection, preferably thumb activated and preferably in combination with a handle positioned on the planar element to offer leverage to the hand of the user engaging the projection, to thereby ease the removal of the visor apparatus from a smooth surface on which it is removably mounted.

Accordingly, it is an object and purpose of the present invention to provide for a motor vehicle a visor which can be easily, quickly and safely be attached to the interior of the vehicle windshield and subsequently detached and relocated to another position on the windshield so as to accommodate frequently changing glare or sun positions.

It is also an object and purpose of the present invention to provide a visor which attains the foregoing objects and purposes, and which also can be attached and subsequently detached and relocated with only one hand while driving.

It is another object of the invention to provide a visor which is attachable to various positions on a vehicle windshield or window by one or more suction cups, and which includes means for simultaneously breaking the vacuum of each suction cup, thereby permitting the visor to be safely and quickly detached without pulling or wrenching.

It is yet another object of the invention to provide a suction cup release mechanism for quickly and easily breaking the vacuum of suction cups.

Objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE PREFERRED EMBODIMENTS OF THE INVENTION (BEST MODES FOR CARRYING OUT THE INVENTION)

The present invention relates generally to a suction cup release mechanism, and more particularly to a visor apparatus using such suction cup release mechanism.

Figure 1:
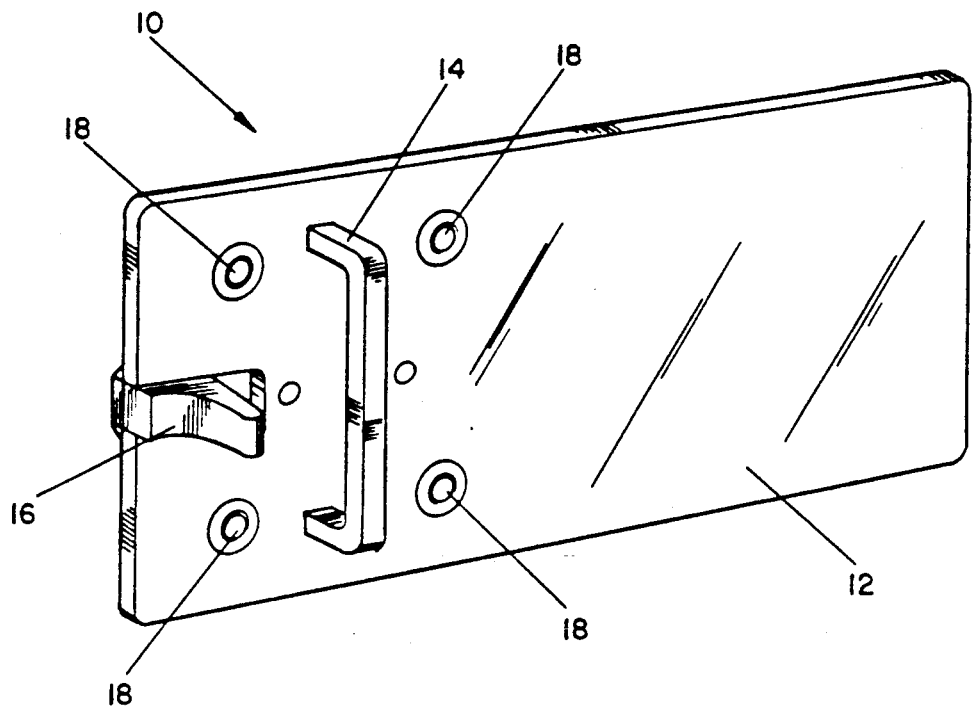
FIG. 1 is a view of the front face of a preferred embodiment of the invention.
Figure 2:
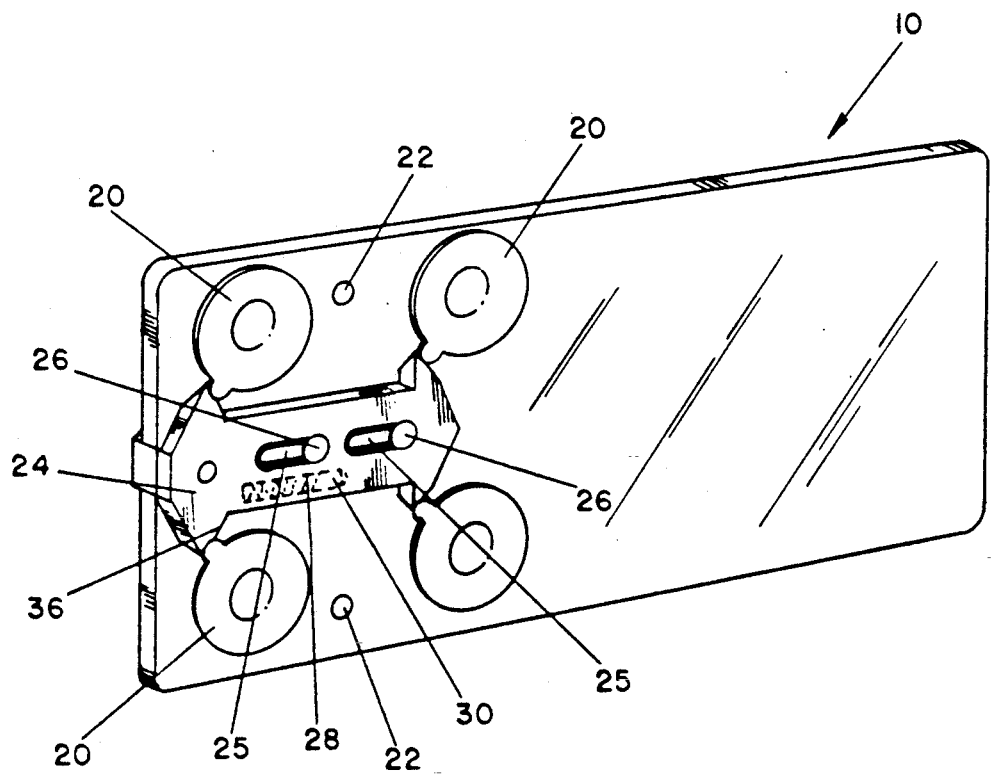
FIG. 2 shows the back of the FIG. 1 embodiment.
Figure 3:
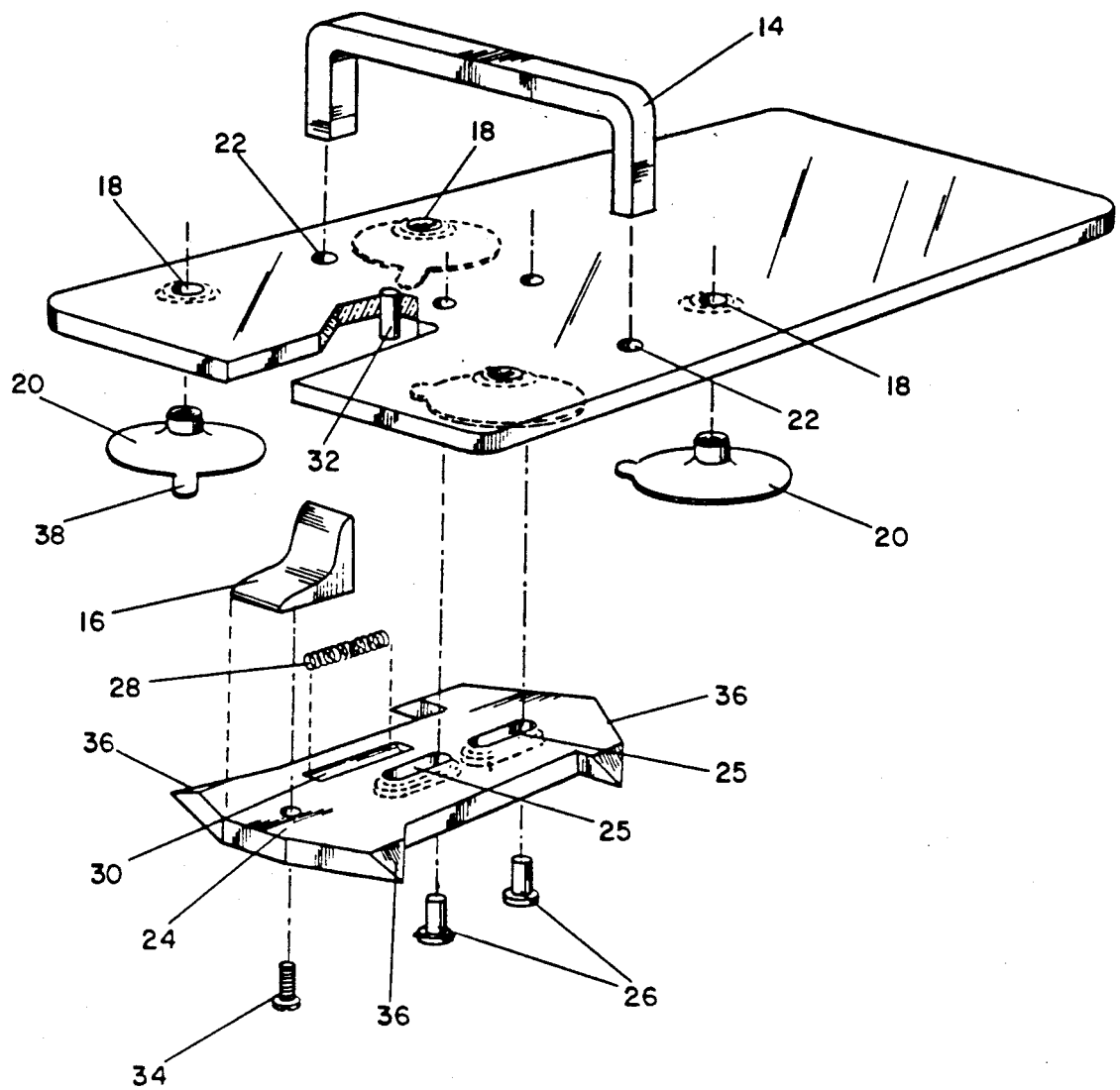
FIG. 3 is a blow-up perspective view of the preferred embodiment of FIG. 1.

Reference is now made to FIGS. 1-3 which illustrate a preferred visor embodiment of the invention 10 comprising a planar element 12, a handle 14, and a user operated projection 16. Suction cup mounts 18 attach suction cups 20, as seen in FIGS. 2 and 3, to planar element 12. Handle 14, preferably translucent, is affixed to element 12 with screw apertures 22, although other attachment means may be utilized in accordance with the invention.

In the preferred embodiment, planar element 12 is essentially flat, but those skilled in the art will appreciate that it may be curved to fit a curved windshield or the like. Too, planar element 12 is preferably a see-through, darkly tinted plastic or glass, or otherwise having reduced light transmission, so that a vehicle user can see through the planar element 12 to observe the road, water or the like, and make use of the rear view mirror. Alternatively, if desired, the planar element can be opaque, lightly tinted, or treated optically in accordance with a particular use. The preferred embodiment is shown shaped and sized to accommodate conventional truck windshields and side windows. This size and shape is quite suitable for windshield or window use to cover a glare-affected field of view. Nonetheless, those skilled in the art in accordance with the invention will be able to construct visors of other shapes. Likewise, the visor and suction cup release mechanism have a variety of uses, in accordance with the invention, such as for windows in automobiles, airplanes, boats, and other vehicles, or windows in buildings and other structures, on smooth surfaces, such as desk tops, and the like.

Figure 4:
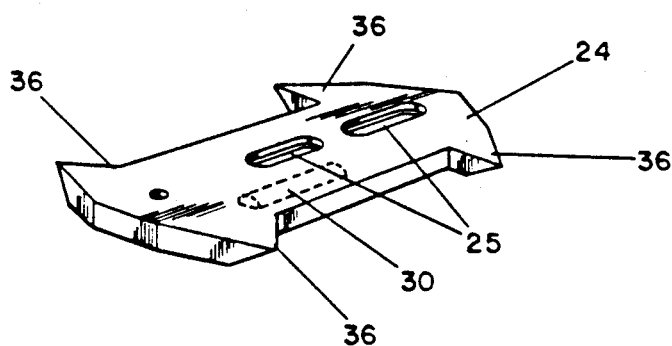
FIG. 4 shows a bottom view of the suction cup disengaging knife edge carrying slide bar of the preferred embodiment.

The suction cup release or disengaging mechanism of the invention, best seen in FIGS. 2-4, comprises a suction cup disengaging knife edge carrying slide bar 24, slidably mounted to an element, such as element 12, using bolts 26 or the like, which are disposed in slide slots 25. The slide bar 24 is preferably spring loaded in its out-of-use position using a biasing spring 28 in a slot 30 in bar 24. One end of spring 28 engages a pin 32 mounted on element 12 and projecting into one end of the slot 30. The spring 28 may be disposed to the side of the slide slots 25 or between the slide slots 25.

Projection 16, which may be disposed on or integral with slide bar 24, is used to actuate slide bar 24. FIG. 3 shows projection 16 attached to a slide bar 24 by a screw 34, although other attachment means may be utilized, or the projection 16 may be formed integrally with slide bar 24. Knife or sloped edges 36 on slide bar 24 engage suction cups 20 to break the vacuum and release the suction cups 20 when desired.

In the preferred visor embodiment 10, suction cups 20 have tabs 38 thereon which are engaged by knife edges 36 in order to pry the lips of the suction cups 20 up from the windshield or window on which the suction cups 20 are adhered. Although tabs 38 are very useful items which prolong the usefulness of the suction cups, the knife edges could be positioned to directly separate the lips of the cups from the surface on which they are disposed. Nonetheless, the combination of the knife edges 36 which, when the slide bar is actuated, simultaneously engage tabs 38 or lips, is a unique feature of the invention and leads to a very user friendly apparatus.

In operation, a user presses the visor 10 where desired, onto a windshield or window, pressing it thereon using handle 14 which is positioned generally central to the location of the four suction cups 20, for even force distribution thereacross. When the user decides to remove or reposition the visor, he or she grasps handle 14 with his or her fingers, engages projection 16 with his or her thumb, and moves his or her thumb toward the handle and his or her fingers. The slide bar 24, which is connected to projection 16 and which spring biases the knife edges 36 away from suction cup tabs 38 or lips, moves and thereby slides the knife edges 36 under tabs 38 or lips, thus pulling the lips of the suction cups away from the surface on which they are disposed, breaking the suction to release the visor.

The invention has been described in detail with particular reference to a preferred embodiment thereof, but it will be understood that variations and modifications can be effected within the scope of the invention.

What is claimed is:

1. A suction cup release mechanism comprising:
   one or more suction cups;
   a slide bar comprising at least one knife edge cooperably positioned to disengage a lip on at least one said suction cup; and
   means controllable by a user for actuating said slide bar to disengage said lip.

2. The invention of claim 1 wherein said mechanism is spring loaded in a position disengaged from said suction cup.

3. The invention of claim 1 wherein said user actuating means comprises a user operated projection operably connected to said slide bar.

4. The invention of claim 3 wherein said user operated slidable projection is thumb-actuated.

5. The invention of claim 1 comprising one knife edge for each suction cup to be disengaged.

6. A suction cup release mechanism comprising:
   one or more suction cups;
   a slide bar comprising at least one knife edge cooperably positioned to disengage a tab disposed on a lip on at least one said suction cup; and
   means controllable by a user for actuating said slide bar to disengage said tab.

7. The invention of claim 6 wherein said mechanism is spring loaded in a position disengaged from said suction cup.

8. The invention of claim 6 wherein said user actuating means comprises a user operated projection operably connected to said slide bar.

9. The invention of claim 8 wherein said user operated slidable projection is thumb-actuated.

10. The invention of claim 6 comprising one knife edge for each suction cup to be disengaged.

* * * * *